US011999185B2

(12) United States Patent
Lüttgens

(10) Patent No.: US 11,999,185 B2
(45) Date of Patent: Jun. 4, 2024

(54) PENCIL SHARPENER

(71) Applicant: Fritz Lüttgens, Erlangen (DE)

(72) Inventor: Fritz Lüttgens, Erlangen (DE)

( * ) Notice: Subject to any disclaimer, the term of this patent is extended or adjusted under 35 U.S.C. 154(b) by 226 days.

(21) Appl. No.: 17/713,297

(22) Filed: Apr. 5, 2022

(65) Prior Publication Data

US 2022/0324251 A1 Oct. 13, 2022

(30) Foreign Application Priority Data

Apr. 7, 2021 (DE) ........................ 202021101862.3

(51) Int. Cl.

| | |
|---|---|
| ***B43L 23/00*** | (2006.01) |
| ***B08B 1/12*** | (2024.01) |
| ***B08B 1/20*** | (2024.01) |
| ***B08B 1/32*** | (2024.01) |
| ***B43L 23/02*** | (2006.01) |
| ***B43L 23/08*** | (2006.01) |

(52) U.S. Cl.

CPC .............. *B43L 23/008* (2013.01); *B08B 1/12* (2024.01); *B08B 1/20* (2024.01); *B08B 1/32* (2024.01); *B43L 23/02* (2013.01); *B43L 23/08* (2013.01)

(58) Field of Classification Search

CPC ........ B43L 23/008; B43L 23/02; B43L 23/08; B08B 1/32; B08B 1/20; B08B 1/12

USPC ........................................................... 30/454

See application file for complete search history.

(56) References Cited

U.S. PATENT DOCUMENTS

| | | | | |
|---|---|---|---|---|
| 11,040,568 B1 * | 6/2021 | Hanson | .................. | B43L 23/08 |
| 2004/0154172 A1 | 8/2004 | Tatz | | |
| 2005/0005459 A1 | 1/2005 | Donaldson | | |
| 2008/0149220 A1 * | 6/2008 | Hongtao | ................ | B43L 23/02 144/28.72 |
| 2010/0175788 A1 * | 7/2010 | Yeh | ......................... | B43L 23/06 144/28.72 |
| 2012/0192995 A1 * | 8/2012 | Chen | ....................... | B43L 23/08 144/28.8 |
| 2015/0224816 A1 * | 8/2015 | Weiland | ................. | B43L 23/04 30/453 |
| 2016/0068009 A1 * | 3/2016 | Chen | ..................... | B43L 23/008 144/28.11 |
| 2017/0050462 A1 * | 2/2017 | Jones | ..................... | A45D 40/20 |
| 2017/0190206 A1 * | 7/2017 | Schumacher | ......... | B43L 23/008 |
| 2018/0236809 A1 * | 8/2018 | Zheng | ..................... | B43L 23/02 |

* cited by examiner

*Primary Examiner* — Omar Flores Sanchez
(74) *Attorney, Agent, or Firm* — Smartpat PLC

(57) ABSTRACT

The present disclosure provides a pencil sharpener for pencils having a lead surrounded by a lead carrier. The pencil sharpener includes a hollow guide channel for the pencil to be sharpened. An inner surface of the guide channel forms a guide surface for a partial area of a lead carrier of the pencil to be sharpened. To prevent contamination of an outer surface of the lead carrier the inner surface of the guide channel is interrupted by at least one cleaning groove extending in an axial direction of the guide channel.

3 Claims, 4 Drawing Sheets

PENCIL SHARPENER

CROSS-REFERENCE TO RELATED APPLICATION

This application claims the benefit of German Patent Application No. 202021101862.3, filed 2021 Apr. 7, the contents of which is hereby incorporated by reference in its entirety.

TECHNICAL FIELD

The present disclosure relates to a pencil sharpener, in particular a soft lead pencil sharpener, for example for sharpening soft leads of cosmetic pencils.

BACKGROUND

Soft lead cosmetic pencils usually consist of a fixed lead carrier, in which the soft lead of the pencil is axially guided. Thus, the soft lead can be axially extended out of the lead carrier, in order to be used for writing in the case of a pencil or for make-up in the case of a cosmetic pencil. Thereby, the lead carrier is more or less cylindrical or conical in the region where the lead exits. The pencil sharpener has a hollow guide channel, the inner surface of which is designed as a guide surface for the lead carrier. The inner contour of the guide channel is adapted to the outer contour of the lead carrier in the region of the lead exit. A lead former is mounted in axial direction in front of the guide channel. The lead former can be designed as a cutting blade, scraper rib or other forming tool, in order to form the soft lead in the desired manner.

Since lead material is chipped off during the forming of the soft lead, small amounts of lead mass may penetrate into the region of the guide surface of the pencil sharpener and smear or contaminate the outer surface of the lead carrier.

SUMMARY

The present disclosure provides a pencil sharpener for pencils having a lead surrounded by a lead carrier. The pencil sharpener includes a hollow guide channel for the pencil to be sharpened. An inner surface of the guide channel forms a guide surface for a partial area of a lead carrier of the pencil to be sharpened. To prevent contamination of an outer surface of the lead carrier the inner surface of the guide channel is interrupted by at least one cleaning groove extending in an axial direction of the guide channel. In other words, the otherwise continuous inner surface of the guide channel is interrupted by the cleaning groove.

In this manner, lead material resting on the outer skin of the lead carrier can fall down into the cleaning grooves and may be transported away. In addition, the two edges or flanks that the cleaning groove forms together with the surface of the guide channel act like scraping edges that remove lead material located on the outer skin of the lead carrier, with the result that such material falls down into the groove and is transported away.

In an advantageous embodiment, the flank or edge between the cleaning groove and the inner surface of the guide channel is sharp-edged. In an alternative embodiment, such sharp edge can be formed by a longitudinal edge with either a negative or positive angle, in order to form an active cutting edge.

In a further advantageous embodiment, the inner surface of the guide channel and/or the surface of the cleaning groove may have a surface with a lotus effect.

In a further embodiment, it is provided to provide a cleaning medium in the cleaning groove, i.e. to fill the cleaning groove with a cleaning medium.

In a further advantageous embodiment, a plurality of cleaning grooves is distributed around the circumference of the guide channel.

Finally, in a further embodiment, it is provided that one or more cutting blades or cutting knives are arranged in the guide channel.

By means of an exemplary embodiment, the pencil sharpener is explained in further detail.

The following detailed description is merely exemplary in nature and is not intended to limit the invention or the application and uses of the invention. Furthermore, there is no intention to be bound by any theory presented in the preceding background or the following detailed description.

DETAILED DESCRIPTION

Figure 1:
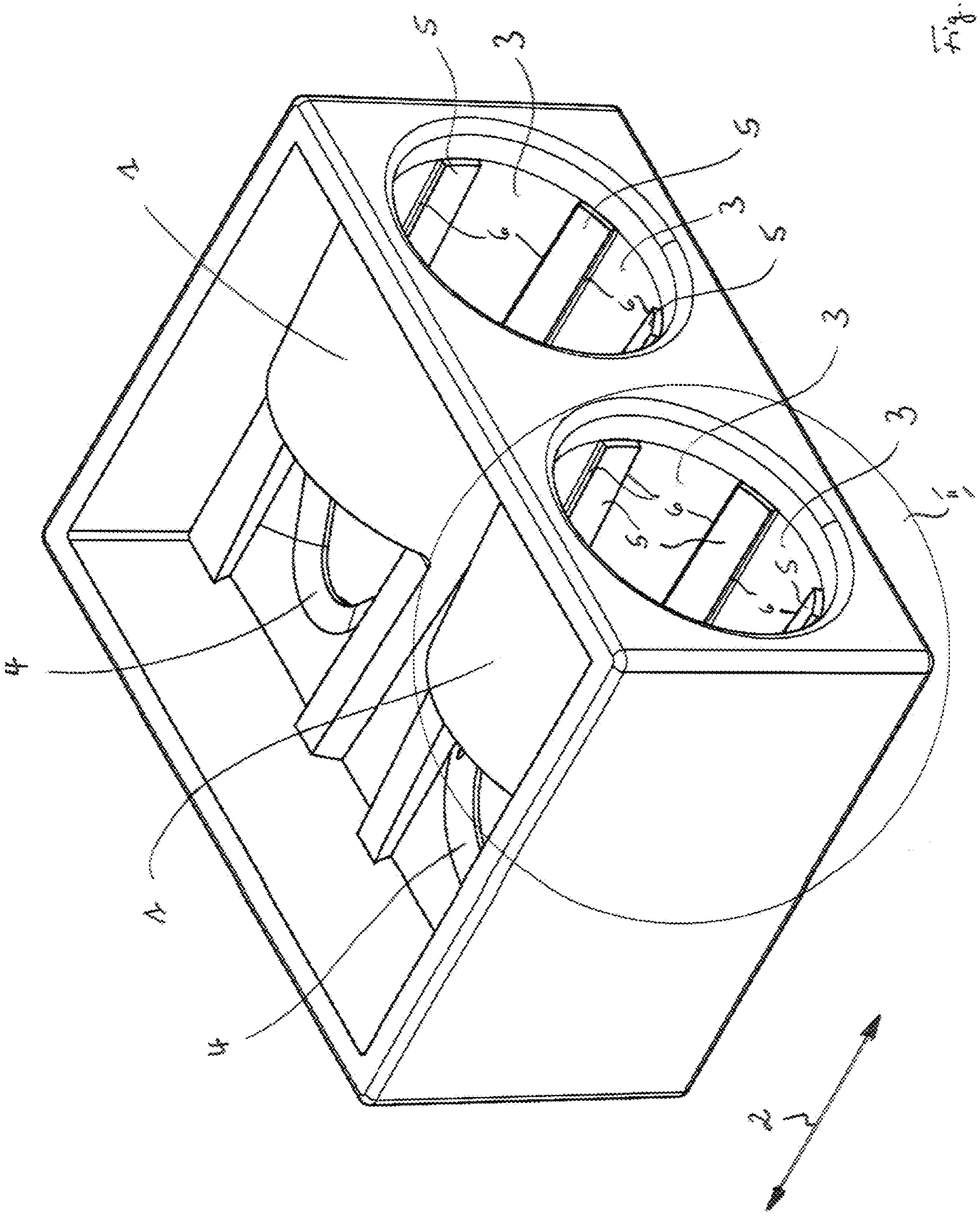
FIG. 1 shows a pencil sharpener with two parallel guide channels for pencils to be sharpened in a perspective view.
Figure 2:
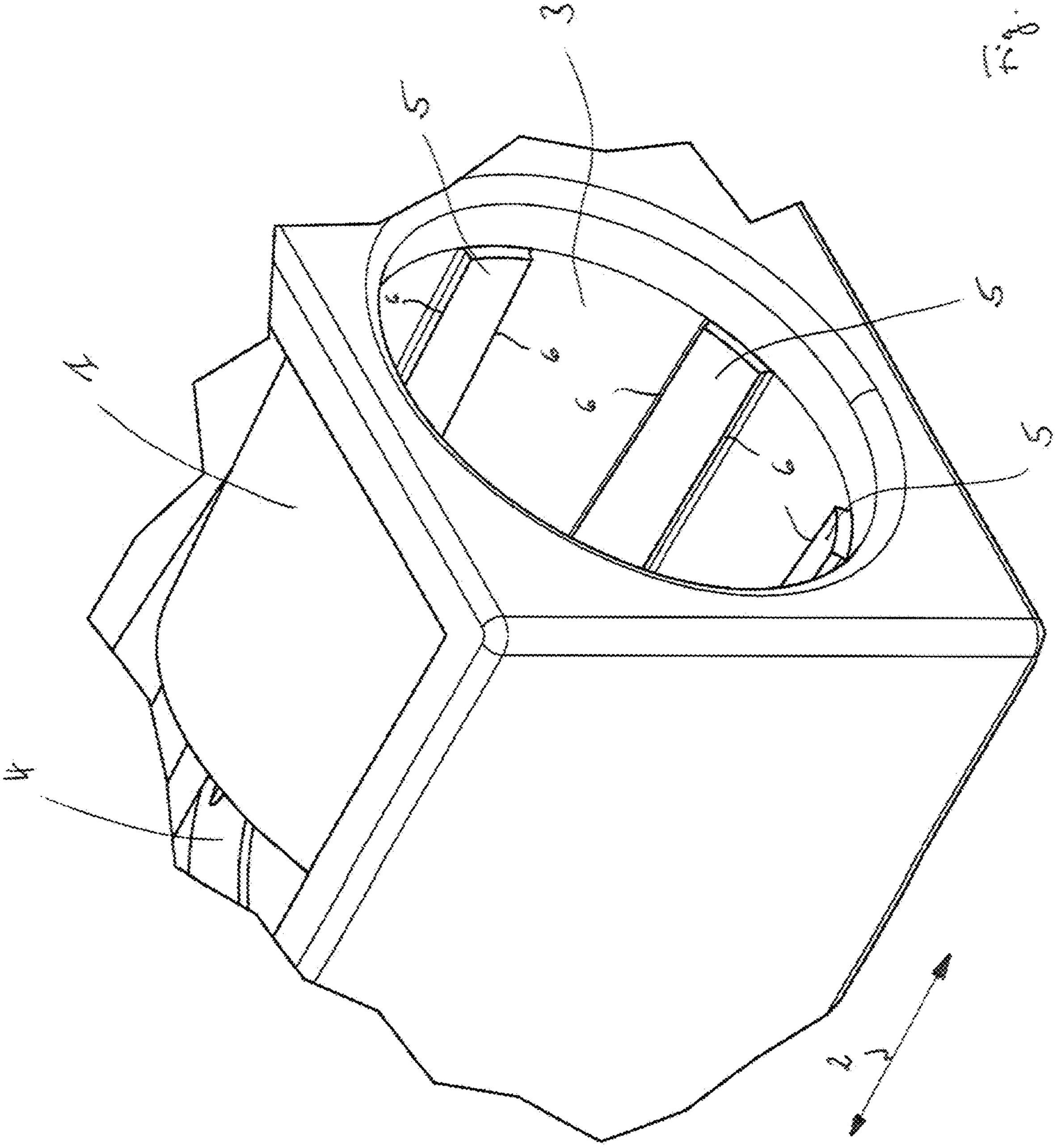
FIG. 2 shows the detail II from FIG. 1.
Figure 3:
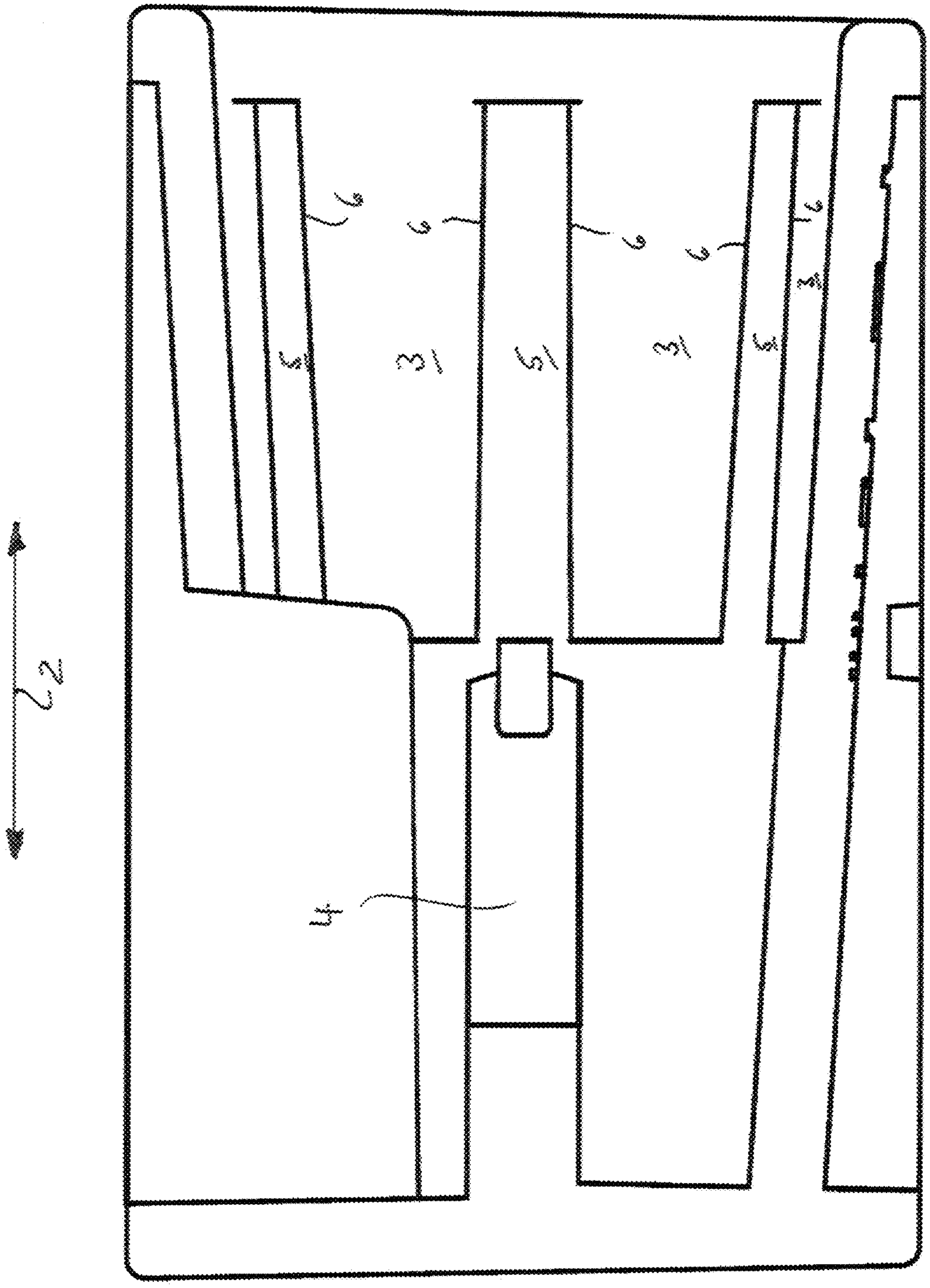
FIG. 3 shows a sectional side view of the guide channel of the sharpener.
Figure 4:
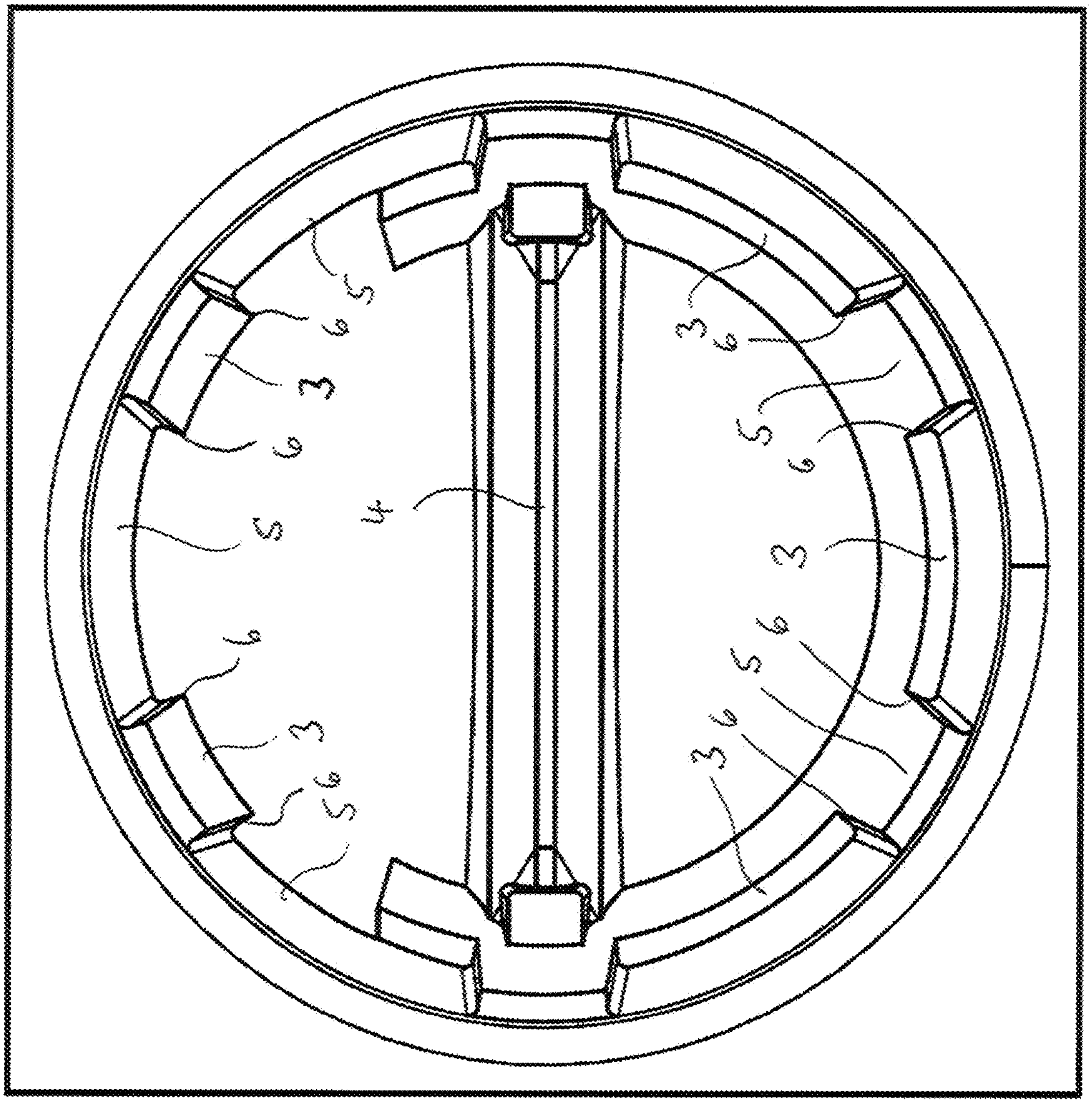
FIG. 4 shows a top view of the insertion opening of the pencil guide channel from FIG. 2.

The sharpener shown in FIG. 1 has two parallel guide channels 1. The guide channels 1 extend in the axial direction 2. Guide surfaces 3 in the guide channels 1 are joined in the axial direction 2 by U-shaped scraper ribs 4 in the exemplary embodiment as forming tools for the soft lead to be formed of the pencil not shown in the figures. Furthermore, three cleaning grooves 5 are visible in the exemplary embodiment.

Each of the guide surfaces 3 forms common groove flanks 6 with the cleaning grooves 5. Such grooved flanks 6 may be designed to be sharp-edged. However, they may also be designed as longitudinal edges with either a negative angle or a positive angle. The mode of action of the pencil sharpener is as follows:

The tip of the lead carrier of the pencil to be sharpened is inserted into the guide channel 1. The outer wall of the pencil tip then rests against the guide surfaces 3. The pencil is rotated clockwise in order to sharpen the soft pencil lead engaged with the scraper rib 4. If lead material falls onto the outer surface of the tip of the lead carrier, it is lifted off the outer surface of the tip of the lead carrier by the grooved flanks 6, which act in the manner of scraping strips, and falls into the adjacent cleaning groove 5 and can thus be transported out of the sharpener.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

LIST OF REFERENCE SIGNS

1 Guide channel
2 Axial direction

3 Guide surface
4 Scraper rib
5 Cleaning groove
6 Grooved flank

What is claimed is:

1. A pencil sharpener, comprising a hollow guide channel (1) for a pencil to be sharpened, wherein an inner surface of the hollow guide channel (1) forms a guide surface (3) for a partial area of a lead carrier of the pencil to be sharpened, and wherein the inner surface of the hollow guide channel (1) is interrupted by at least one cleaning groove (5) extending in an axial direction (2) of the hollow guide channel (1), and wherein a sharp-edged grooved flank (6) is arranged between the at least one cleaning groove (5) and the inner surface (3) of the hollow guide channel (1).

2. The pencil sharpener according to claim 1, wherein the at least one cleaning groove (5) is part of a plurality of cleaning grooves (5) distributed around a circumference of the hollow guide channel (1).

3. The pencil sharpener according to claim 1, further comprising a cutting blade arranged in the hollow guide channel (1).

* * * * *